March 16, 1937. J. STAUBER 2,074,283
PROCESS AND A PLANT FOR THE VENTILATION OF CLOSED ROOMS
Filed Aug. 1, 1935
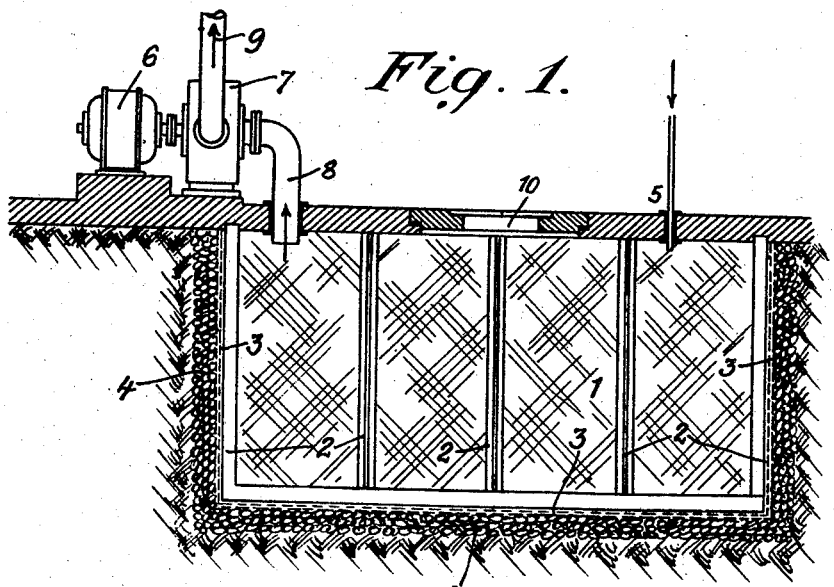
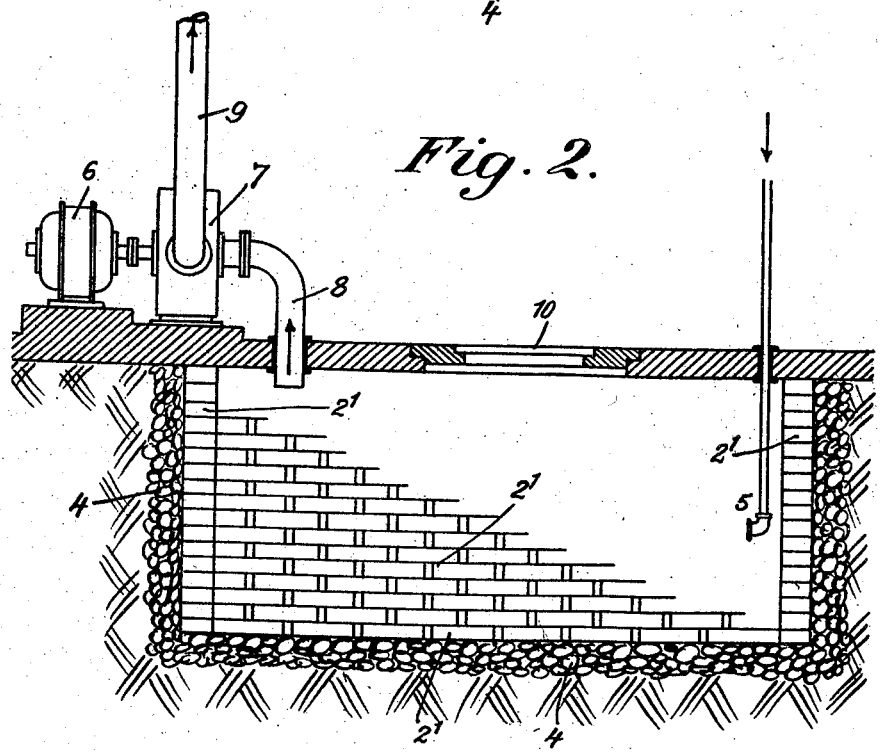
J. Stauber
INVENTOR Patented Mar. 16, 1937

2,074,283

UNITED STATES PATENT OFFICE 2,074,283

PROCESS AND A PLANT FOR THE VENTILATION OF CLOSED ROOMS

Jakob Stauber, Schlieren, Switzerland

Application August 1, 1935, Serial No. 34,289
In Switzerland August 6, 1934

5 Claims. (Cl. 98—1)

The present invention refers to a process and a plant for the ventilation of closed rooms and is for instance adapted to prevent poisonous gas from entering into closed rooms. The invention can also be used—when cold water is used—for cleaning sucked air for reducing the temperature of the air in closed rooms.

The process according to the present invention consists in sucking air from the atmosphere through natural soil and to deliver it into the closed rooms which are to be ventilated.

On the accompanying drawing two examples of a plant forming part of the present invention are represented each in a vertical section. In this drawing, 1 represents a shaft formed in the earth-ground beneath a building, this shaft having for instance a volume of about 1½ to 2 m³ with air permeable side walls and ground.

In the example according to Fig. 1 the bottom and the side-walls consist of an iron-frame work 2 with wire netting 3 whilst according to Fig. 2 ground and side-walls consist of a masonry 2¹ of cement or brick, with joints of about 5 cm. breadth. Below said bottom and outside the side-walls of the shaft a layer of gravel is provided. Into the shaft a water atomizing device 5 discharges for cleaning and—at low water temperature—cooling the air sucked from the earth. For sucking the air a motor 6 is provided for driving a fan 7 or any other air-pump the suction-pipe 8 of which communicates with the shaft and the pressure-pipe 9 of which communicates with the closed rooms to be ventilated. 10 represents a glass-window in the cover of the shaft.

The air-pump or fan can be driven by an electric or by a water- or combustion motor even from a cycle. It sucks the air from the sides and from below out of the earth into the shaft and drives it into the closed rooms of the building whereby this air under pressure drives back poisonous gases which may be there and fills the building with fresh air. The earth acts as a filter for the poisonous gases and the action of the filter is approximately proportional to the passage of said gases through the earth.

By means of the process described the temperature of a room can be reduced to about 12° Cels. at an outer temperature of 16° Cels. or more. By using a sufficiently strong motor air may be sucked even from clay-ground. For taking air from great depth the upper parts of the side-walls of a shaft may be tightened by a layer of cement or otherwise.

What I claim is:

1. A process for the ventilation of closed rooms consisting in sucking air from the atmosphere through the natural earth-ground so as to filter the air, and distributing the filtered air to closed rooms for ventilation purposes.

2. A process for the ventilation of closed rooms consisting in sucking air from the atmosphere through the natural earth-ground for filtering the air, cleaning this air and withdrawing the treated air and simultaneously forcing it to the closed rooms to be ventilated.

3. A process for the ventilation of closed rooms consisting in sucking air from the atmosphere through the natural earth-ground for filtering the air, cooling the air and driving it into the rooms.

4. A process for the ventilation of closed rooms consisting in sucking air from the atmosphere through the natural earth ground, cleaning and cooling this air by atomized water and driving it into the closed rooms.

5. A plant for the ventilation of closed rooms comprising a shaft made in the ground and including a bottom, side walls and a cover, the side walls as well as the bottom of the shaft being permeable for air while the cover is closed and air-tight, and an air pump placed in the shaft to suck air from the earth ground into the said shaft and to drive it into the rooms to be ventilated.

JAKOB STAUBER.